Jan. 21, 1936. J. B. HOWE 2,028,545

WEIGHING MECHANISM

Original Filed March 28, 1933

Inventor,
Joseph B. Howe,
by Roberts Cushman & Woodbury
Attys.

Patented Jan. 21, 1936

2,028,545

UNITED STATES PATENT OFFICE 2,028,545

WEIGHING MECHANISM

Joseph B. Howe, Worcester, Mass., assignor to Geo. S. Harwood & Son, Boston, Mass., a co-partnership composed of John H. Harwood and John H. Harwood, Jr.

Original application March 28, 1933, Serial No. 663,113. Divided and this application February 26, 1934, Serial No. 712,892

11 Claims. (Cl. 308—2)

This invention pertains to weighing mechanism and is herein illustrated, by way of example, as embodied in a machine for weighing and delivering textile fiber to a carding machine, the present application being a division of my application for Letters Patent, Serial No. 663,113, filed March 28, 1933. In my Patents No. 1,859,444, dated May 24, 1932; No. 1,675,756, dated July 3, 1928; No. 1,531,945, dated March 31, 1925; No. 1,531,944, dated March 31, 1925; and No. 1,434,058, dated October 31, 1922, I have disclosed certain improvements in weighing mechanism of the class described, designed primarily to eliminate errors and to increase the accuracy of the weighing operation whereby to insure greater uniformity in product than was possible with prior apparatus.

However, observation of the operation of my patented mechanism under commercial conditions has led me to the production of the further improvements hereinafter set forth and which form the subject matter of the present invention, such improvements being illustrated by way of example as embodied in a machine of the kind specifically disclosed in my aforesaid Patent No. 1,675,756 in which a single lever acts both to initiate the dumping of the pan and also to reset the pan in its load-receiving position.

In machines of the type referred to the scale pan is often of large dimensions and the pan and the scale beam which carries it thus constitute an oscillating structure of considerable mass. Since accuracy of weighing is the primary desideratum sought for in such mechanism and since the weighing operation is repeated many times an hour, day-in and day-out, year-after-year, it is of great importance to provide fulcrum means for the scale pan and scale beam which, while permitting unimpeded operation, will resist wear under the conditions of use so as to maintain the accuracy of weighing throughout long periods of time. It is further desirable to provide fulcrum means of simple type and preferably such as may be adjusted readily both in assembling the parts initially, in order to secure accuracy of balance and to permit ready adjustment to compensate for such wear as may develop, or to accommodate the parts to varying conditions of use.

Preferably I provide knife edge fulcrums for the scale pan and beam respectively, the fulcrum members being of hard, wear-resistant material, for example, hard steel, and being supported for ready adjustment and/or replacement so as to furnish new and sharp knife edges as occasion may demand.

As those parts of the scale beam and pan which rest on the knife edges are usually of cast iron, they tend to wear quite rapidly, and to lessen wear at these points I provide wear pieces, preferably of some hard steel alloy, secured to the pan and beam, respectively, and preferably adjustable so as to permit them to be set accurately with reference to the knife edges on which they rest as well as to furnish fresh contact surfaces when through long use the wear pieces become worn or indented by contact with the knife edges.

Preferably these wear pieces have substantially flat surfaces to rest on the knife edges so that a line of almost mathematical accuracy forms the only contact between the rocking part and its fulcrum. Thus great accuracy and delicacy of weighing is obtainable. At the same time adjustment of the pan or beam in a direction transverse of the knife edge is readily accomplished, for example, in order to obtain a proper initial balance of the unloaded parts. However, in order to maintain the fulcrum and its cooperating wear plate in the position to which the parts have thus been adjusted, keeper members are provided which, while not substantially interfering with the free oscillation of the beam or pan, respectively, prevent bodily displacement of the rocking parts relatively to their fulcrums.

A further object of the invention is to provide fulcrum means so adjustable in the direction of the knife edge as to permit proper setting of the scale beam or scale pan so as to avoid interference with other parts of the machine as the pan and scale oscillate.

Other objects and advantages of the present invention will more fully appear in the detailed description and by reference to the accompanying drawing.

Figure 1:
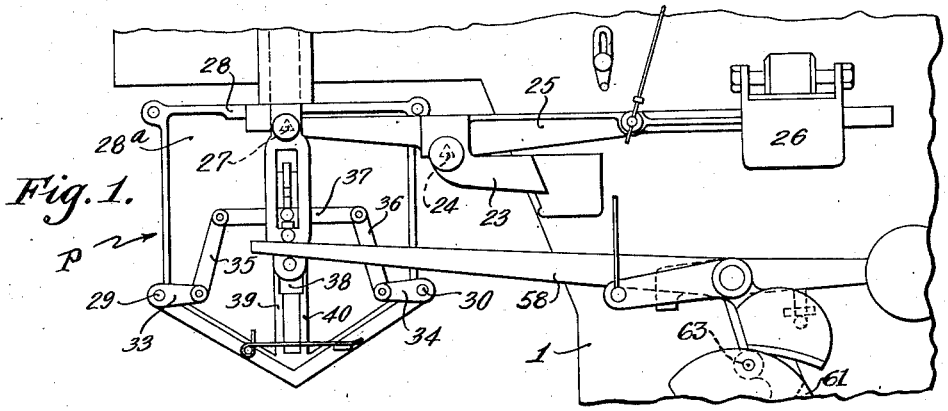
Fig. 1 is a fragmentary end elevation of a textile weighing machine embodying the present invention, but omitting many of the parts not concerned directly with said invention.

While the present invention is of more general utility, I have herein illustrated it as embodied in a textile weighing machine such as a card feeder comprising a frame 1 enclosing means (not shown) for elevating textile fiber and delivering it into the scale pan in order that the material may be weighed out into uniform batches which are dropped from the scale pan and carried away.

Each end of the frame of the machine carries a bracket 23 supporting a fulcrum pin 24, the two fulcrum pins being aligned with each other and providing knife edge supports for the composite scale beam consisting of two parallel lever arms 25, but one of which is shown. For convenience in further description, the single arm 25 which is shown, will be referred to as the "scale beam". This scale beam is provided with a counterbalance weight 26 at one end, and at the other carries a fulcrum pin 27 providing a knife edge support for the scale pan P.

This scale pan is here shown as of the type more fully described in the patent to Howe No. 1,675,756,—comprising end frames 28, which may be castings, held in spaced relation, if desired, by longitudinal rods, and which support side and end walls 28a of sheet metal or other suitable material, and movable bottom closure members which also may be of sheet metal. The end frames of the pan provide bearings for two parallel shafts 29 and 30 to which the respective bottom closures are fixedly secured. Each of these shafts is provided with a crank arm 33 and 34, respectively, at one end, and these crank arms are connected by links 35 and 36 to the opposite end of a vertically movable equalizer bar 37. This equalizer bar is secured at its central part to a vertically movable slide member 38 guided between ribs 39 and 40 forming a part of the end frame of the pan, the ribs being spaced apart to provide a guideway for the slide 38. As thus arranged the two closure members are constrained to turn through substantially equal angles, thus insuring quick dumping and accurate closing.

Preferred means for actuating the pan whereby to open and close it at proper times comprise the tripping lever 58, the pin 63, and the cam 61, all of which are fully described in the application above referred to, of which this is a division, and need not be more specifically described herein.

Figure 2:
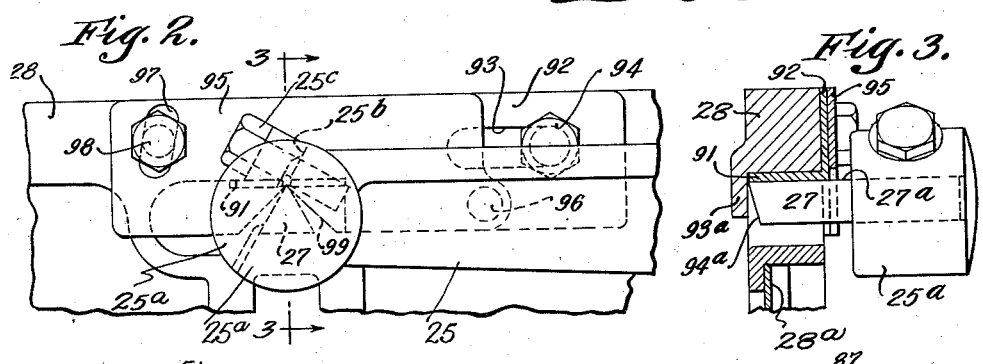
Fig. 2 is a fragmentary elevation showing an improved fulcrum support for the scale pan in accordance with the present invention.
Figure 3:
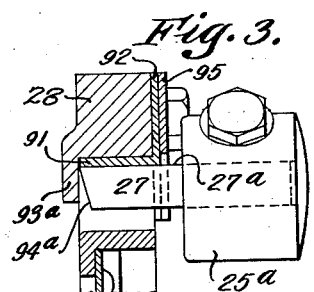
Fig. 3 is a section on the line 3—3 of Fig. 2.
Figure 4:
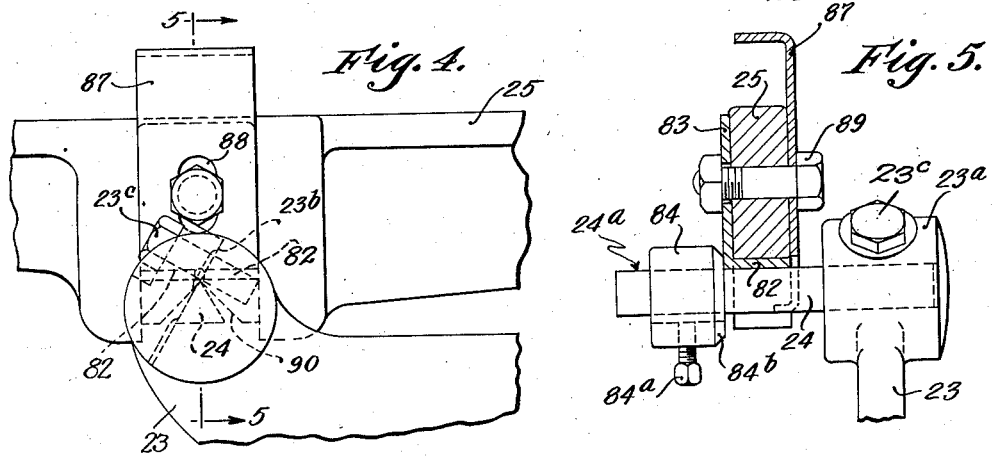
Fig. 4 is a fragmentary elevation illustrating an improved fulcrum support for the scale beam.
Figure 5:
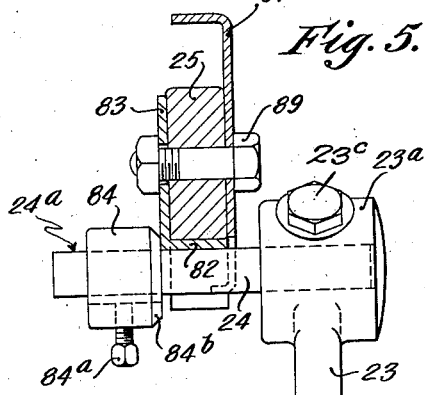
Fig. 5 is a section on the line 5—5 of Fig. 4.
Figure 6:
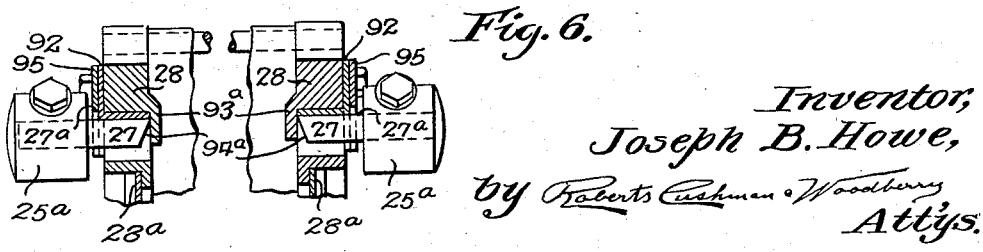
Fig. 6 is a fragmentary diagrammatic section in the vertical plane of the axis of the pan fulcrum.

Referring to Figs. 2 to 5, the bracket 23 which supports the fulcrum 24 for the scale beam is furnished with an apertured boss 23a at its upper end, such boss having an opening, here shown as of substantially triangular cross section, and having its wall split to provide for expansion or contraction of this opening. This split in the wall is indicated at 23b (Fig. 4) and the walls of the boss, at opposite sides of the split, may be drawn toward each other by means of a clamping bolt 23c. The fulcrum member 24 preferably consists of a bar of hard steel or other suitable wear-resistant material, preferably polygonal and, as here shown, triangular in cross section. One end of this triangular bar is seated in the opening in the boss 23a and is firmly clamped therein by means of the bolt 23c, although it may be removed by loosening the bolt. The arrangement of the opening is such that when the bar is inserted therein, one of its corners is directed upwardly to form the knife edge 24a. By removing this bar from the boss, it may be turned and reinserted in the opening so as to present a fresh edge or corner to serve as the knife edge.

As the scale beam is usually made of cast iron or other relatively soft material, it is preferred to provide a wear-resistant member for engagement with the knife edge 24a. This wear-resistant member, as here disclosed, preferably consists of a piece of sheet metal of the desired wear-resistant qualities, for example, alloy steel, nitrided steel, or the like, having a horizontal flange 82 (Fig. 5) which underlies a lower surface of the scale beam 25 and which provides a flat, substantially horizontal under surface to rest on the knife edge 24a. The wear-resistant member also has a vertical flange 83 disposed against the rear side of the scale beam 25, and has a vertically elongated opening for the reception of a bolt 89 for adjustably securing it to the scale beam. By vertical adjustment of the wear pieces at opposite ends of the scale device, the beam may be disposed in accurately horizontal position. Preferably an adjustable stop collar member 84, is secured to the free end of the fulcrum bar 24 by means of a set screw 84a. The end face of the stop collar is preferably beveled at 84b and bears against the flange 83 of the wear piece. This collar limits the movement of the scale beam away from the bracket 23, and as a similar arrangement is provided at each end of the machine, it is obvious that the composite scale beam may be adjusted relatively to the machine frame so as to avoid interference with the latter and when once adjusted is prevented from moving longitudinally of the knife edges. Obviously, if desired, the collar 84 might comprise anti-friction elements, for example ball bearings, to avoid undue friction between it and the beam.

In order to prevent the scale beam from moving transversely of the knife edge, a retainer member 87 is provided. This retainer member consists of a piece of sheet metal, slotted at 88 for the reception of the bolt 89 by which it is secured to the front face of the scale beam. The lower edge of this retainer member 87 is provided with a notch of inverted, substantially V-shape having divergent side walls 90, making a larger angle with each other than do the sides of the fulcrum bar, thus permitting the scale beam to tilt freely without interference, but at the same time serving to prevent bodily movement of the scale beam transversely of the knife edge.

That end of the scale beam which supports the fulcrum pin 27 is furnished with a split boss 25a, split at 25b (Fig. 2) and has a clamping bolt 25c adapted removably to secure the fulcrum pin 27 in the boss. This fulcrum pin, like the fulcrum pin 24 previously described, preferably is a triangular bar of hardened steel with one of its corners directed upwardly to form the knife edge 27a. This knife edge engages the under flat surface of a horizontal wear-resistant member 91 underlying the top member 28 of the end frame of the scale pan and having a vertical flange 92 disposed against the front face of the member 28. This flange has a horizontally elongated slot 93 for the reception of a bolt 94, thus permitting adjustment of the wear-resistant member transversely of the knife edge. Such adjustment facilitates the initial balancing of the scale pan on its fulcrum and makes it possible to provide a fresh contact point if the plate eventually becomes grooved by the knife edge. The member 28 is furnished with a downwardly directed toe 93a disposed opposite to the bevelled free end 94a of the fulcrum bar 27 for the purpose of limiting endwise displacement of the scale pan along the knife edge 27a. To prevent accidental transverse displacement of the scale pan relatively to the knife edge, a retainer 95 is provided. This retainer preferably consists of a piece of sheet metal pivotally secured at 96 to the flange 92 of the wear-resistant member and having a curved slot at 97 which receives an adjusting bolt 98. This retainer is furnished with a wide notch 99 of inverted, substantially V-shape permitting free tipping of the scale pan about its fulcrum, but at the same time preventing bodily transverse movement of the pan.

While, as herein disclosed, by way of example, my improved fulcrum means is very desirable in automatic weighing mechanism of the class described, I contemplate its useful applicability to other forms of apparatus, and regard all applications of the fulcrum means herein disclosed as within my invention as defined in the appended claims.

I claim:

1. In combination in a machine of the class described having a scale pan provided with an end member, a wear-resistant element adjustably secured to the end member of the pan, said element having a substantially flat and horizontal under surface, a knife edge fulcrum engaging said surface, and an adjustable retainer device having spaced surfaces disposed at opposite sides of the knife edge fulcrum to prevent accidental movement of the wear-resistant element of the pan transversely of the knife edge.

2. In combination in a machine of the class described having a scale pan provided with an end member, a sheet metal, wear-resistant element adjustably secured to the end member of the pan, said element having a substantially flat under surface, a knife edge fulcrum engaging said surface, the wear-resistant member having a substantially vertical flange, and a retainer device pivotally secured to the said vertical flange and having an inverted substantially V-shaped notch receiving the knife edge to prevent accidental bodily displacement of the wear-resistant element of the pan transversely of the knife edge.

3. In combination in a machine of the class described having a scale beam and a scale pan supported thereby, a sheet metal wear-piece secured to the scale beam, said wear-piece having a substantially horizontal under surface, a knife edge fulcrum engaging said surface, and a vertically adjustable retainer member secured to the scale beam and having a notch which receives the fulcrum to prevent accidental bodily movement of the wear-piece transversely of the knife edge.

4. In combination in a machine of the class described having a scale beam and a scale pan supported thereby, a sheet metal wear member having a horizontal flange and a vertical flange, a fulcrum member engaging the horizontal flange, means securing the vertical flange to the beam, and retainer members secured to opposite sides respectively of the beam, one of said retainer members being arranged to prevent accidental movement of the beam transversely of the knife edge, and the other retainer member being arranged to limit movement of the beam longitudinally of the knife edge.

5. In combination in a machine of the class described having a scale pan having an end member, a wear-resistant piece of sheet material, means adjustably securing said wear-piece to the end member of the pan for adjustment transversely of the axis of the pan, said wear-piece having a horizontal flange and a vertical flange, a knife edge fulcrum engaging the horizontal flange of the wear-piece, a retainer member pivotally secured to the vertical flange of the wear-piece, said retainer member having an inverted V-notch in its lower edge, the notch receiving the knife edge to prevent accidental transverse movement of the pan relatively to the fulcrum, the sides of the notch converging at a greater angle than that of the knife edge and means for securing the retainer in adjusted position.

6. In combination in a weighing device having a pair of spaced, substantially parallel beam arms and a scale pan suspended between said arms, an elongate fulcrum member secured at one of its ends to each of the respective arms and which has a free overhanging portion projecting toward the other beam arm, each fulcrum member having a knife edge disposed in alignment with that of the other, a wear-piece of sheet metal secured to each end of the pan, each wear-piece having a substantially flat under surface resting upon the knife edge of one of the fulcrum members, an element carried by each end of the scale pan to engage the free overhanging portion of the corresponding fulcrum member thereby to limit endwise movement of the pan and a retainer device secured to each beam arm and having a notch in its lower edge which receives the corresponding knife edge.

7. In combination in a weighing device having a pair of spaced, substantially parallel beam arms and a scale pan suspended between said arms, each arm having an elongate fulcrum member which is fixedly secured at one of its ends to said arm and which has a free end directed toward the other beam arm, each fulcrum member having a longitudinally extending knife edge disposed in alignment with that of the other fulcrum member, each fulcrum member being adjustable longitudinally, and a wear-piece adjustably secured to each end of the scale pan, each wear-piece having a substantially flat under surface resting upon the knife edge of the corresponding fulcrum member, each beam arm having an abutment element engaging the free end of the corresponding fulcrum member, the free end of each fulcrum member being beveled.

8. In combination in a weighing device having a pair of substantially parallel beam arms and a scale pan suspended between said arms, the pan suspending means comprising a substantially horizontal wear-plate secured to each end of the pan, and a fulcrum member carried by each beam arm, each fulcrum member having a knife edge for engagement with the corresponding wear-plate, the wear-plates being movable transversely of the respective knife edges to permit initial balancing of the scale pan, and means for retaining the wear-plates in adjusted position transversely of the respective knife edges.

9. In combination in a weighing device having a pair of substantially parallel beam arms and a scale pan suspended between said arms, a normally fixed fulcrum member for each beam arm, each fulcrum member being supported at one of its ends and having a free end directed toward the other fulcrum member, each fulcrum member having a knife edge, the knife edges of the two fulcrum members being in substantial alignment, a wear-plate carried by each beam arm and resting on one of the knife edges, respectively, and a collar adjustably secured to each fulcrum member between the free end of the latter and the corresponding wear-plate, the collars being operative to limit movement of the scale beam arms lengthwise of the respective knife edges.

10. In combination in a weighing device having a pair of substantially parallel beam arms and a scale pan suspended between said arms, a fixed fulcrum member for each of said beam arms, a pair of spaced, substantially flat wear-pieces secured to the respective beam arms and resting upon the respective fulcrum members, and means for independently adjusting the respective wear-pieces in a vertical direction.

11. In combination in a weighing device having a pair of substantially parallel beam arms and a scale pan suspended between said arms, a fixed fulcrum member for each of said beam arms, a pair of substantially flat wear-pieces secured to the respective beam arms and resting upon the respective fulcrum members, each beam arm being bodily adjustable in a horizontal direction for shifting its flat wear-piece transversely of the corresponding fulcrum, and means for retaining each beam arm in adjusted position relative to its fulcrum.

JOSEPH B. HOWE.